(Model.)

2 Sheets—Sheet 1.

J. P. FULGHAM.
BROADCAST SEEDER.

No. 248,730. Patented Oct. 25, 1881.

WITNESSES:

INVENTOR:
Jesse P. Fulgham
by Hill & Church,
His Attys.

(Model.)
2 Sheets—Sheet 2.
J. P. FULGHAM.
BROADCAST SEEDER.
No. 248,730. Patented Oct. 25, 1881.
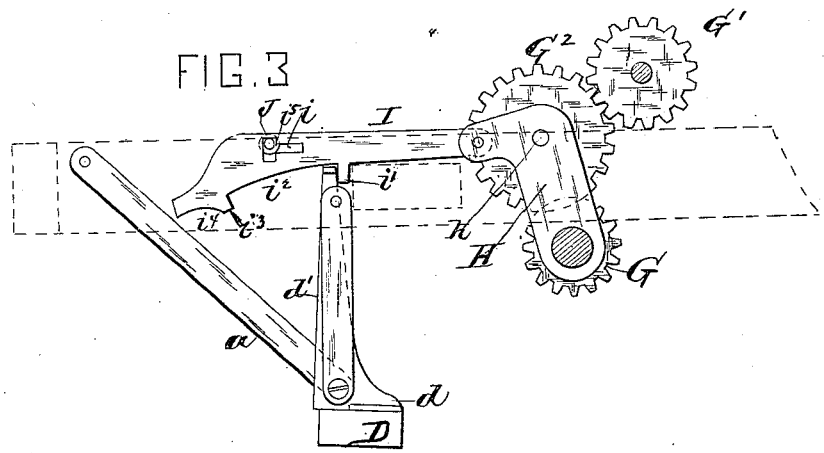
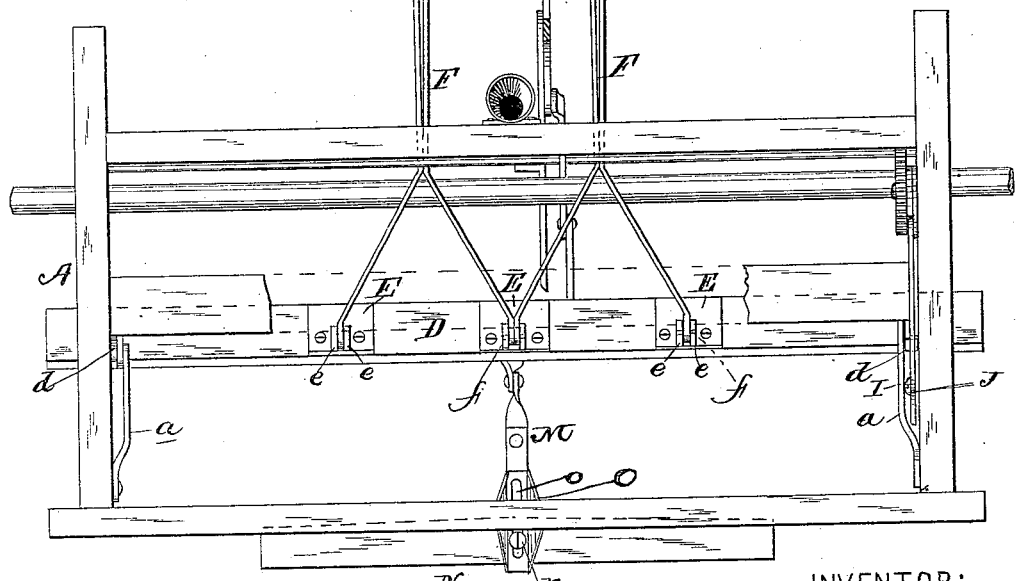
WITNESSES:
INVENTOR:
Jesse P. Fulgham
by Hill & Church
His attys

UNITED STATES PATENT OFFICE.

JESSE P. FULGHAM, OF RICHMOND, INDIANA, ASSIGNOR OF ONE-HALF TO THE WAYNE AGRICULTURAL COMPANY, OF SAME PLACE.

BROADCAST SEEDER.

SPECIFICATION forming part of Letters Patent No. 248,730, dated October 25, 1881.

Application filed July 11, 1881. (Model.)

*To all whom it may concern:*

Be it known that I, JESSE P. FULGHAM, of Richmond, in the county of Wayne and State of Indiana, have invented certain new and useful Improvements in Broadcast Seeders; and I do hereby declare the following to be a full, clear, and exact description of the same, reference being had to the accompanying drawings, forming a part of this specification, in which—

Figure 1:
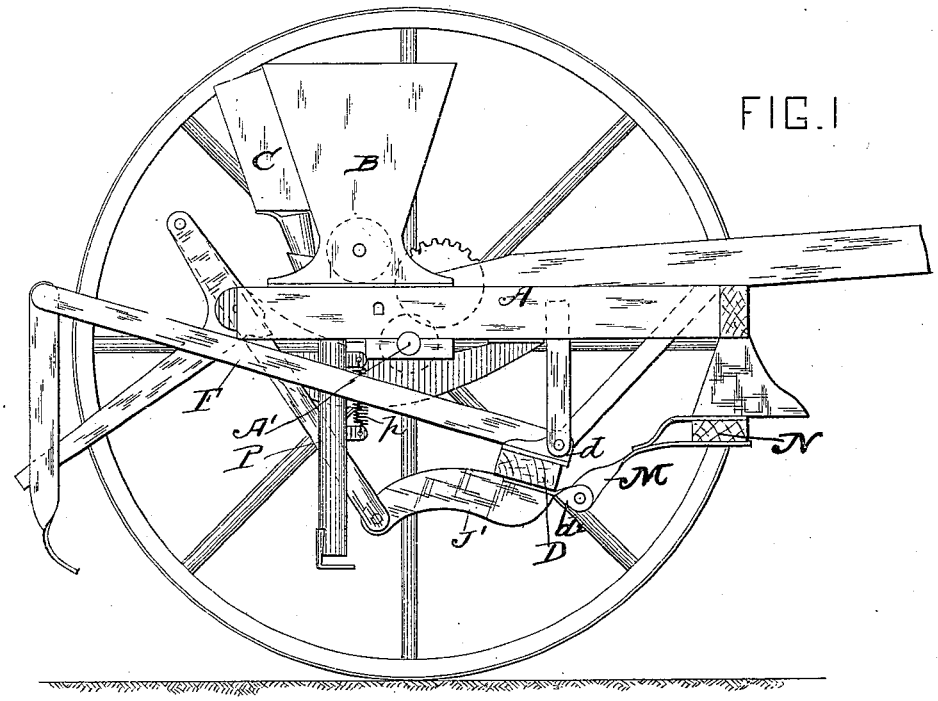
Figure 2:
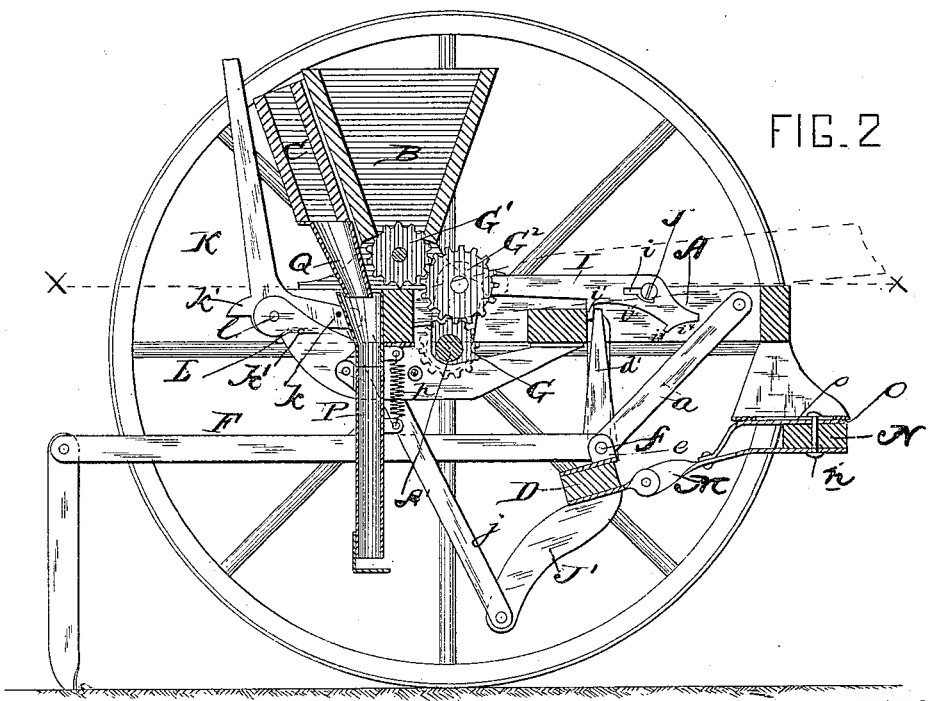

Figure 1 is a side elevation of the machine, showing the drag-bars elevated. Fig. 2 is a transverse vertical sectional view, showing the drag-bars lowered. Fig. 3 is a detail view of the gear-shifting devices; and Fig. 4 is a horizontal sectional view taken on the line $x\ x$, Fig. 1.

Similar letters of reference in the several figures denote the same parts.

This invention has for its object to improve that class of machines knows as "broadcast seeders;" and it consists in the combination, with an intermediate gear mounted upon a swinging support, of a shifting-plate of peculiar construction, and an arm mounted on an oscillating drag-rail for operating said shifting-plate, whereby the tilting of the drag-rail to lower or raise the drag-bars will connect or disconnect the gearing, so as to automatically throw the seed-dropping mechanism into or out of operation.

It further consists in combining with an oscillating rail, to the upper side of which the drag-bars are attached, and to which also the gear-shifting mechanism is connected, of an improved draft attachment which brings the draft of the team directly on the under side of said rail in such a way that the draft tends to draw the rail over, thus insuring the proper connection and locking of the gearing.

In the drawings, A represents the main frame of the machine; A′, the axle or driving shaft upon which the frame is mounted, and to which the transporting or driving wheels are connected in the usual manner.

B represents the grain-hopper; C, the grass-seed hopper; G, the gear on the main drive-shaft: G′, the gear on the grain-shaft, and $G^2$ the intermediate gear.

D represents an oscillating drag-rail, provided with hinge-blocks $d\ d$ at its ends, by which it is hinged to arms $a\ a$, depending from the main frame in front of the axle, as shown. Secured to the upper side of this drag-rail are a series of pivot-blocks, E, to the ears $e\ e$ of which the forward bifurcated or spread-apart ends of the drag-bars F are hinged by means of bolts $f$. The spreading apart of the ends of the drag-bars gives them a wide bearing, which prevents them from side-play, but does not prevent them from rising and falling freely in vertical planes.

The intermediate gear, $G^2$, is mounted upon a stud, $h$, projecting laterally from an arm, H, hung loosely upon the main drive-shaft, and connected to said arm is the rear end of a shifting-plate, I. This plate I is provided with a slot, $i$, of peculiar construction at its forward end, into which projects a stud or pin, J, secured to the main frame; and it is further formed with a lug, $i'$, a curved incline, $i^2$, a spur, $i^3$, and a shorter curve, $i^4$, all as shown in Fig. 3.

One of the hinge-blocks $d$ on the drag-rail D, is provided with an arm, $d'$, which extends upward, and is adapted to operate upon the shifting-plate I, when the drag-rail is rocked to raise or lower the drag-bars, as will be presently explained.

To the under side of the drag-rail is secured an arm, J′, which projects rearward and has articulated to it a connecting-rod, $j$, that is also articulated to the short arm $k$ of an angular operating-lever, K, pivoted at $l$ to a bracket, L, as shown. By depressing this lever K the drag-rail is turned or oscillated so as to unearth and raise the drags, and when the connecting-rod $j$ comes into line with its said short arm $k$, a projection, $k'$, on the lever strikes a stop, $l'$, on the bracket, and the lever becomes locked, thus holding the drags elevated. Upon raising the handle of the lever slightly, so as to throw its short arm and the connecting-rod out of line, the drags are permitted to descend by gravity into the earth.

M represents a draw-bar, the rear side of which is articulated to a hinge-block, $d^2$, secured to the under side of the rail D, while to its forward forked end is pivoted a double-tree or evener, N, by a pin or bolt, $n$, which pin also extends up into and plays back and forth in a slot, o, in a bracket, O, secured to the under side of the main frame, as shown, its head resting on the inside of the bracket, and thus supporting the double-tree and the front end of the draw-bar. The slot in the bracket is of sufficient length to prevent the bolt from coming in contact with either end in any position which the draw-bar may take when in operation.

P represents the receiving and scattering tubes, the same being made in two sections, hinged together at their rear sides and connected by a spring, p, at their front sides, so as to hold them firmly together normally, but permit the lower section to swing backwardly upon striking an obstruction. The upper section is firmly secured to the main frame of the machine.

The grain from the grain-hopper is adapted to be dropped by the feeding devices located therein directly into the scattering-tubes, and the grass-seed is also adapted to be conducted from the grass-seed hopper into the said tubes by means of a series of spouts, Q, secured to the grass-seed hopper, as shown.

Suitable feeding devices are designed to be provided in the grass-seed hopper, and the same are adapted to be geared to the grain-shaft or independently to the main drive-shaft, as preferred.

When the machine is in operation and it is desired to lift and unearth the drags, the drag-rail D is oscillated by operating the lever K, as before described, whereupon the upper end of the arm $d'$ strikes the curved incline $i^2$, on the under side of the shifting-plate I, and lifts said plate up so as to disengage the locking-shoulder $i^5$ in its slot $i$ from the stud J. Said arm then strikes the spur $i^3$ and draws the plate forward, thus rocking the arm H and throwing the intermediate gear, $G^2$, out of mesh with the gear G on the grain-shaft. On letting the drags down again the arm $d'$ passes back under the shifting-plate, and, coming in contact with the lug $i'$, carries the plate backward and again throws the gear $G^2$ into mesh with the gear on the grain-shaft.

Should it be desired at any time to sow the seed without cultivating, the drags may be raised and the plate I drawn back by hand till the locking-shoulder $i^5$ falls behind the stud J and the gears go into mesh.

In letting the drags down while the gears remain in mesh, the arm $d'$ strikes against the curve $i^4$ of the plate I, lifts the plate up, and passing under the spur $i^3$ comes against the lug $i'$, and forces the intermediate gear into mesh again, should it have become unmeshed while the plate was raised as the arm passed the spur.

The hinge-block $d^2$, being fastened to the under side of the drag-rail, and consequently below the pivotal point of the same, will necessarily be drawn backward when the drags are raised, carrying with it the draw-bar and double-tree, the bolt $n$, which supports the latter parts, sliding back and forth in the slot in the bracket.

When the machine is stationary it sometimes happens that when the drags are lowered the points of the cogs on the gears $G'$ $G^2$ come in contact and prevent said gears from going properly into mesh; but when the machine is in motion and the gear $G^2$ running, the points of the teeth will slip off from each other, and the draft of the team applied through the drag-rail and arm $d'$ will force the plate I backward and throw the gears properly in mesh.

The grain and grass seed, either separately or together, are conducted to near the surface of the ground by the conducting-tubes and there scattered in the usual manner, by striking on a suitable plate or table at the lower end of the tubes.

Having thus described my invention, I claim as new—

1. In a seeding-machine, the combination of the intermediate gear, mounted upon a swinging support, with the shifting-plate having the downwardly-projecting lug, the spur, and the curved incline between the lug and the spur, and with the operating-arm on the oscillating drag-rail, substantially as described.

2. In a seeding-machine, the combination, with the intermediate gear, mounted upon a swinging support, of the shifting-plate having the slot, the shoulder in the slot, the downwardly-projecting lug, and the spur, and the curved incline between the lug and the spur, the stud projecting into the slot in the plate, and the operating-arm on the drag-rail, substantially as described.

3. In a seeding-machine, the shifting-plate having the slot, the shoulder in the slot, the downwardly-projecting lug, and the spur, the curved incline between the lug and the spur, and the short curved portion, in combination with the stud working in the slot of the plate and the operating-arm on the oscillating drag-rail, substantially as described.

4. In a seeding-machine, the combination of the adjustable intermediate gear, the shifting-plate, the oscillating drag-rail carrying the arm for operating the shifting-plate, and a draft attachment connected to the under side of the drag-rail, substantially as described, for the purpose specified.

5. In a seeding-machine, the combination of the oscillating drag-rail to which the drag-bars are connected, the draw-bar connected to the under side of the drag-rail, the whiffle-tree, the slotted bracket, and the supporting-pin which works in the slot in the bracket, substantially as described.

6. In a seeding-machine, the combination of the drag-bars, the drag-rail, the draw-bar, and the double-tree, whereby the draft is taken directly from the drag-bars to the double-tree, substantially as described.

JESSE P. FULGHAM.

Witnesses:
THADDEUS WRIGHT,
DONALD R. McGREGOR, Jr.